May 16, 1961 M. A. EGGAN 2,984,045
FLORAL HOLDERS AND CLAMPS THEREFOR
Filed Feb. 5, 1958

BY
Charles H. Redman
Att'y.

United States Patent Office 2,984,045
Patented May 16, 1961

2,984,045

FLORAL HOLDERS AND CLAMPS THEREFOR

Maurice A. Eggan, 1141 Woodland Ave., Batavia, Ill.

Filed Feb. 5, 1958, Ser. No. 713,322

1 Claim. (Cl. 47—41)

This invention relates to improvements in floral holders and more particularly to novelly constructed means adapted to be attached easily and quickly to a container for flowers, and the like, in a novel and efficient manner so as to hold suitable stem receiving material in position within the container.

Florists and others who make floral arrangements with cut flowers, ferns and the like, use a variety of containers such as, for example, a bowl or flower pot. The container is partially filled with a mass of material into which stems of the flowers, etc., are inserted so that a predetermined floral arrangement can be maintained. This mass may comprise any suitable material such as, for example, crumpled wire mesh, foliage and paper scrap, matted plastic, fabric or metal fibers, "styrofoam" blocks or perforated stem holders. However, owing to the non-uniform distribution of the flowers supported in this mass, it frequently occurs that the mass shifts, twists or tips in the container, or expands and becomes loose, with the result that the intended arrangement is not maintained.

The present invention has for one of its objects the provision of novel means adapted to be detachably mounted on the container in such manner as to frictionally engage with, or in, the mass so as to retain it in place in the container irrespective of the load distribution. This is accomplished by the provision of novelly constructed inexpensive spatula-like clamps or fingers which may be easily and quickly attached to and removed from a container and which, when in place thereon, extend inwardly radially downwardly from the upper region of the container and engage in or bear firmly against the mass inwardly of its edges to retain it in place.

Another object is to provide a novel device for clamping a loose mass in a container firmly.

Another object is to provide a novel holder assembly for a floral arrangement.

With the foregoing and such other objects in view, which will appear as the description proceeds, the invention consists of certain novel features of construction, arrangement and combination of parts hereinafter fully described, illustrated in the accompanying drawings, and particularly pointed out in the appended claim, it being understood that various changes in form, proportion, size and minor details of the structure may be made without departing from the spirit of the invention.

Referring to the drawings in which the same characters of reference are employed to identify corresponding parts:

Figure 1:
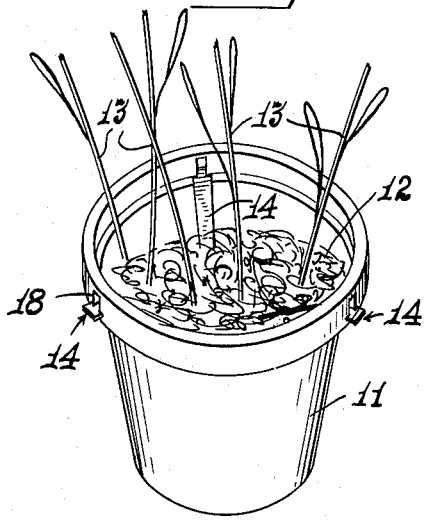
Figure 1 is a perspective view of a container having a floral arrangement therein and provided with clamps embodying features of the present invention.
Figure 3:
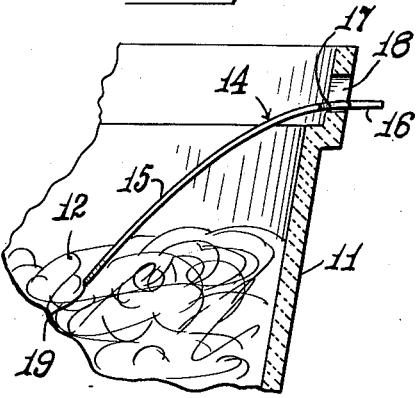
Figure 3 is a fragmentary sectional view taken substantially on line 3—3 of Figure 1.
Figure 4:
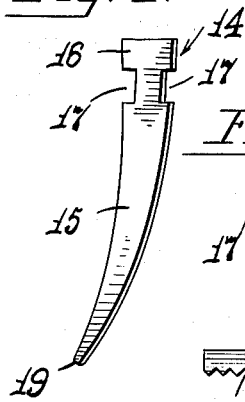
Figure 4 is an enlarged perspective view of one of the clamps shown in Figure 1.

Referring to the accompanying drawings and particularly to the embodiment of the invention shown in Figures 1–4, inclusive, the container for the floral arrangement may comprise any suitably shaped receptacle, such as the flower pot 11. A loose, porous or perforated mass 12 is arranged in the lower portion of the container. This mass may comprise any material capable of having the stems 13 of flowers, or the like, thrust therein in any desired arrangement. Preferably, the mass is formed of loosely matted fibers, strands of strips such as steel wool, shredded paper, or plastic material, foliage, and the like, and in some instances may comprise crumpled loosely woven mesh such as screening, or a block of "styrofoam" or a perforated solid. In any event, the unevenly distributed load of the artistically arranged flowers often, and usually does, causes the mass to shift, tilt, slide, expand or otherwise become displaced in the container with the result that the predetermined floral arrangement is disturbed and rendered unattractive.

In order to prevent such displacement of the mass, the container is fitted with a plurality, preferably three, spatula-like clamps or fingers 14 which are mounted, in a manner to be described presently, on or adjacent to the upper edge of the container. As shown, the fingers 14 extend downwardly-inwardly radially to locate their free ends on or embedded in the mass inwardly of the edge thereof. These fingers are thereby effective to hold the mass against expansion or displacement.

The clamp or finger 14 illustrated in Figures 1–4, preferably comprises a strip of plastic material, although it obviously may be made of any suitable shape-retaining substance. The clamp 14 has a main elongated longitudinally arched body portion 15 separated from an end portion 16 by a pair of laterally extending notches 17 opening on opposed longitudinal edges thereof and having a width greater than the thickness of the wall of the container. The presence of the notches 17 constitutes means to enable the clamp to be quickly and easily attached to and removed from the container. In the present embodiment, the wall of the container 11 is provided adjacent to its upper perimeter or rim with a plurality of mutually spaced vertical slots 18 each of a width corresponding substantially to the width of the clamp material between the opposed lateral notches 17 and of a length greater than the width of the main body portion 15 and end portions 16 thereof.

To mount a clamp 14 on the container 11, the clamp is inserted in either direction through a slot 18 while being held with its plane surface vertically. When the clamp has been inserted a distance sufficient to locate its notches 17 in register with the slot 18, the clamp is turned to locate its plane surface substantially horizontally whereupon the side edges of the notches embrace the related margins of the container at the slots. This securely retains the clamp in place on the container and the downwardly inclined free terminal 19 of the inwardly-radially extending body portion 15 is pressed downwardly so as to frictionally engage or embed itself in the mass inwardly of its edge and thereby prevent displacement of said mass irrespective of the distribution of the load supported thereby. If desired the terminal end 19 of the clamp may be pointed as shown.

Figure 5:
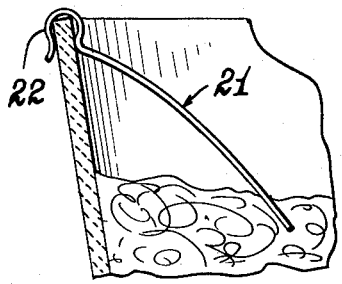
Figure 5 is a fragmentary sectional view, similar to Figure 3, showing a modified form of clamp.

In the Figure 5 illustration the clamp 21 is shaped generally like the clamp 14 except that in this instance the mounting end thereof is rolled outwardly downwardly to form a yieldable gripping jaw 22 adapted to be snapped over the upper edge or rim of the container wall. This arrangement retains the clamp in place on the container and its construction avoids the need for the provision of the previously discussed mounting slots in the container wall, thus adapting it for use on any container of conventional construction.

Figure 6:
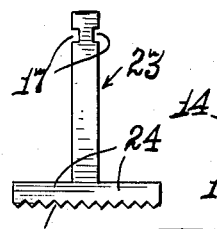
Figure 6 is an elevational view of another form of clamp.
Figure 2:
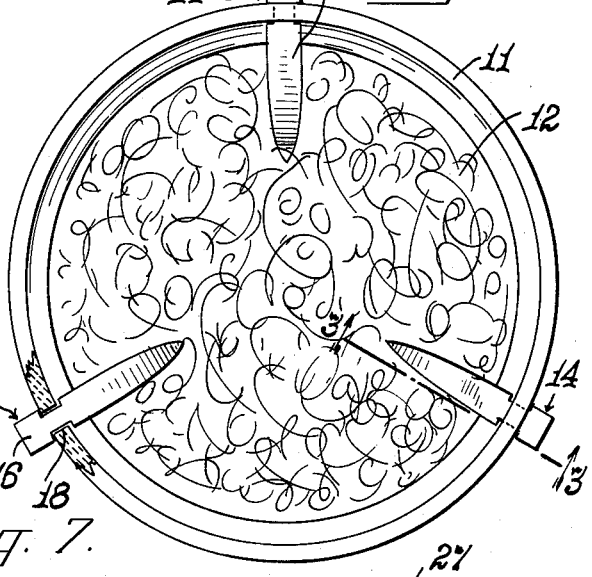
Figure 2 is a plan view, on an enlarged scale and partially broken away of the container shown in Figure 1.

The clamp 23 illustrated in Figure 6 may have its mounting end formed with lateral notches 17, as shown, or it may be provided with the yieldable jaw of the Figure 5 construction. In either event, the mass engaging end is shaped with lateral extensions 24 defining an elongated mass engaging edge, which edge may be formed with serrations 25 or otherwise roughened to insure frictional engagement with the mass.

Figure 7:
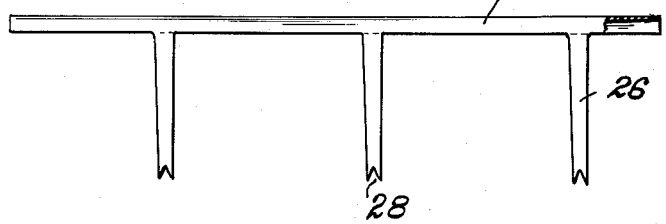
Figure 7 is an elevational view of a multiple clamp.

Figure 7 illustrates the construction of a plurality of clamp or fingers 26 formed integral with a mounting strip 27. In this instance, the free terminals of the fingers 26 are forked, as at 28. The mounting strip 27 preferably is shaped, in section, as an inverted channel so as to be fitted over the peripheral edge or rim of the container when in place thereon.

It should be quite apparent that the clamps or fingers, irrespective of their precise form, are inexpensive to manufacture and are adapted to be easily and quickly mounted and removed and that they each function to engage and hold the mass firmly in place without obstructing or interfering with the use of the mass.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

Having thus described the invention, what is claimed as new and desired to be secured by Letters Patent is:

A holder and means for supporting cut flowers or the like in the holder comprising a container including an upstanding wall, said wall having at least one vertically elongated opening therein, a mass of flower supporting material nested in said container below said opening, a flat strip of resiliently flexible shape-retaining material extended through said opening, said strip extending inwardly downwardly to dispose its innermost end in engagement with said mass inwardly radially of the wall, and notches adjacent the other end of said strip contactingly embracing the marginal areas of the wall at the vertical edges of the opening for retaining the strip in place, said strip being of a width to permit its passage freely through the opening when disposed in a plane substantially parallel with the longest dimension of the opening.

References Cited in the file of this patent

UNITED STATES PATENTS

| 1,648,570 | White | Nov. 8, 1927 |
| 2,228,730 | Pinnecker | Jan. 14, 1941 |
| 2,407,507 | Mitchell | Sept. 10, 1946 |
| 2,567,583 | Stromer | Sept. 11, 1951 |

FOREIGN PATENTS

| 1,176,584 | France | Nov. 24, 1958 |
| 9,556 | Switzerland | Feb. 7, 1895 |
| 264,833 | Switzerland | Feb. 1, 1950 |